United States Patent Office 3,267,799
Patented August 23, 1966

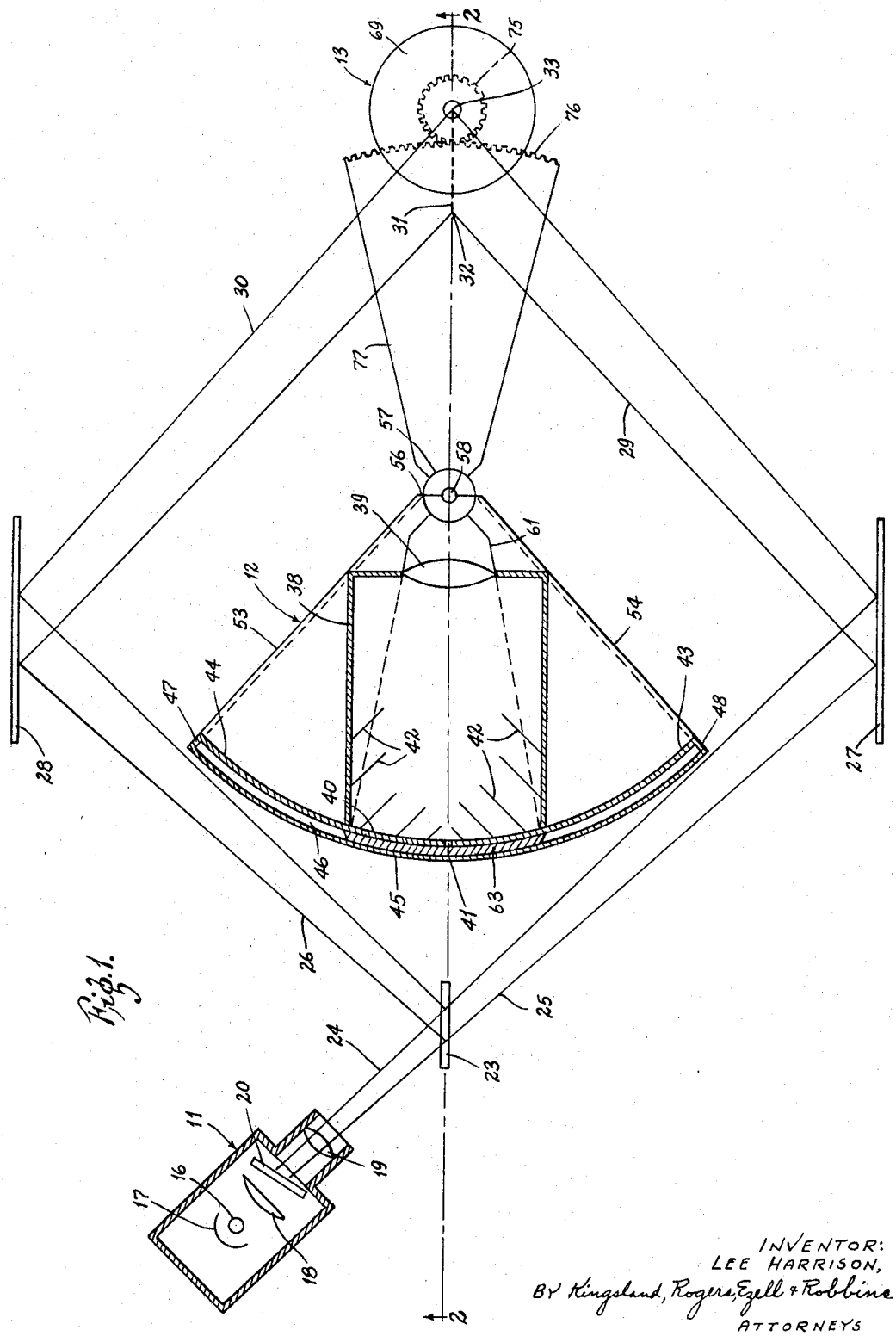

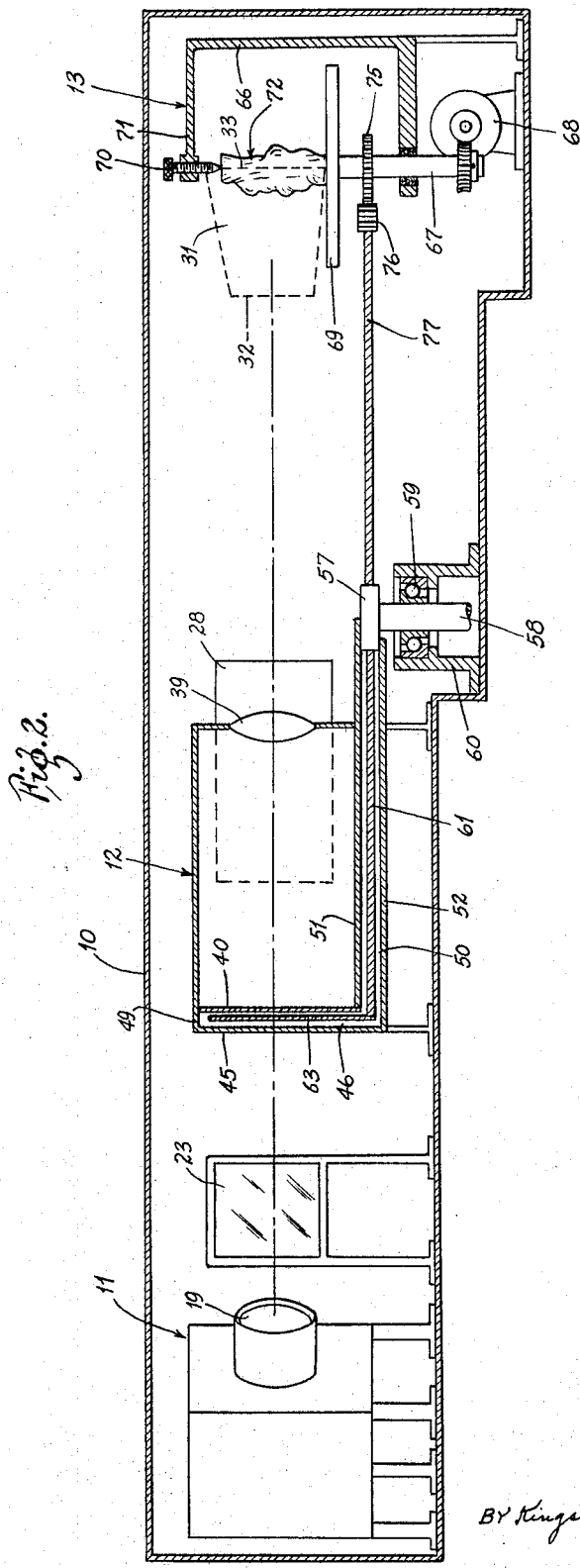

3,267,799
SYSTEM FOR RECORDING THE SURFACE
CHARACTERISTICS OF AN OBJECT
Lee Harrison III, 72 E. Germantown Pike,
Norristown, Pa.
Filed Oct. 21, 1963, Ser. No. 317,632
6 Claims. (Cl. 88—24)

This invention relates to a system for reading and recording the distance from the axis of an object of points on the surface of the object. It therefore relates to a system for reading and recording the surface characteristics of the object. To make the recording, the object is rotated through a plane of focused light that is the image of a projected light wedge. The plane of light varies uniformly between light and dark, and as the object rotates, different points on its surface intersect the light plane at places of different shades between white and dark according to the distance of such points from the axis of the object. Accordingly, these different points reflect light of different shades for the same reason. A camera holding the film is focused on the light reflected by the points on the object that intersect the focal plane. The camera is masked except for a narrow vertical slit. The film is held in a frame that is movable past the slit. The travel of the film is synchronized with the rotation of the object. Therefore, vertical lines on the film are sequentially exposed as vertical lines on the object pass sequentially through the light plane and reflect light toward the camera. After the film is developed, its exposure density is an accurate representation of the surface characteristics of the object. An object of the invention is to provide a system according to the foregoing.

The system can be used to record the surface irregularities of any object, including moldings and castings of parts of animal bodies, inanimate objects, imaginary animal and inanimate objects. The principal object of the invention is to provide a system for reading and recording the distance of all points on the surface of an object from a preselected axis of the object.

Other objects and advantages will be apparent to those skilled in the art.

In the drawings:
FIGURE 1 is a top schematic plan view of the system, with parts shown in section and with the enclosure removed; and
FIGURE 2 is a view in vertical section taken along the line 2—2 of FIGURE 1 and also showing the enclosure.

A light-tight enclosure 10 houses all the parts of this system. The basic components of the system are a projector 11, a camera 12, and an object support 13.

The projector 11 is generally of standard, conventional construction, having the usual light source 16, reflector 17, condenser 18, and projection lens 19. However, instead of the usual transparency holder, the projector 11 has a light wedge 20 positioned between the condenser 18 and the lens 19. The light wedge 20 is so mounted that it can be rotated to about a vertical axis to select its inclination to the line of the light beam between the light source 16 and the lens 19.

There is a half-silvered mirror 23 in the path of the projection beam 24 from the projector 11 that divides the beam 24 into two beams 25 and 26 of equal intensity. The half-silvered mirror 23 is disposed at a 45° angle to the projection beam 24 so that the angle of the transmitted beam 25 and the angle of the reflected beam 26 are equal relative to the plane of the half-silvered mirror 23.

A flat mirror 27 is located in the path of the beam 25, and a similar flat mirror 28 is located in the path of the beam 26. The angles of incidence of the beams 25 and 26 to their mirrors 27 and 28, respectively, are equal. Therefore, the angles of reflection of the reflected beams 29 and 30 from the mirrors 27 and 28, respectively, are also equal. The beams 29 and 30 intersect at a plane 31 that is aligned with the plane of the half-silvered mirror 23. Adjustment of the angle of the light wedge 20 and the focus of the projection lens 19 are made so that the image of the light wedge 20 comes to focus at the plane 31 (with the expected distortion of the rectangular light wedge to a trapezoidal image). With equal spacing of the mirrors 27 and 28, both beams 29 and 30 focus on the plane 31.

The light wedge 20 causes the focused light beams to define a plane of varying light intensity that progressively varies from white at the leading edge 32 to black at the rear edge 33. Any vertical line through the plane 31 is of uniform light intensity.

The camera 12 is in line with the plane of focus 31. The camera is also positioned to avoid interference with the several light beams. The camera 12 has a housing 38 that is impervious to light. A lens 39 in the front of the housing 38 is in line with the plane of focus 31. The back 40 of the housing 38 is curved to define a portion of a cylinder and is opaque to absorb all light, except that there is a very narrow, vertical slit 41 through the back 40 aligned with the plane of focus 31. There are light baffles 42 in the housing that absorb all light transmitted through the lens 39, except for the thin vertical beam of light that is directed toward the vertical slit 41.

The back wall 40 has extended sides 43 and 44, and there is a parallel curved wall 45 spaced from the wall 40. The walls 40 and 45 define an arcuate slide holder space 46 that has closed ends 47 and 48 and a closed top 49. There is a horizontal space 50, defined by top and bottom walls 51 and 52, that communicates with the lower end of the slide holder space 46, with sides 53 and 54 that close the space.

The front 56 of the space 50 is open, but this opening is completely blocked against light transmission by a circular disk 57 that is fixed to a shaft 58, the shaft 58 being journaled in bearings 59 on a stationary support 60. A supporting arm 61 is connected to the disk 57 and extends through the space 50 between the walls 51 and 52. A film holder 63 extends upwardly from the supporting arm 61. The film holder 63 is curved, and in fact the centers of the partial cylinders defined by the wall 40, the wall 45 and the film holder 63 coincide with the axis of the shaft 58.

The object support 13 comprises a frame 66 that rotatably supports a vertical shaft 67. A motor 68 is geared to rotate the shaft 67. A platform 69 is connected to the upper end of the shaft 67. As shown in FIGURE 2, the frame 66 is shaped to give the platform 69 space for rotation and also to support a centering pin 70 that threads vertically through an upper arm 71 of the frame 66. The pin 70 is coaxial with the shaft 67. An object 72 is intended to be supported on the platform 69 with the centering pin 70 in contact with the upper surface of the object 72.

The shaft 67 also supports a gear 75 that meshes with a curved rack 76 fastened to the end of an arm 77. The other end of the arm 77 is fastened to the disk 57. Thus, when the shaft 67 rotates to rotate the object 72, the arm 77 is rotated about the axis of the shaft 58 causing the shaft 58 and the disk 57 to rotate and thereby causing the film holder 63 to rotate about the axis of the shaft 58.

While the gear arrangement is shown for rotating the film holder 63 when the platform 69 rotates, the drive can be by other means. It is important that the speeds of the platform 69 and film holder be synchronized, but methods are known for doing this. A servo drive is an example. Such a drive would permit variation of the distance between the object support 13 and the camera 12.

To prepare the device for operation, the object 72 is centered on the platform 69 and is fastened in place by turning down the centering pin 70. The centering pin 70 contacts the upper central axis of the object 72, and since the lower end of the centering pin 70 is a point, the object 72 can rotate as the platform 69 is rotated.

The object 72 is coated with a non-Lambertian reflecting substance such as fine glass beads.

The transparency 20, which as already said, is a light wedge, is rotated, and the lens 19 adjusted to focus an image on the plane of focus 31. The beam 24 from the projector passes through the light wedge 20 and the lens 19 to the half-silvered mirror 23 where it is divided into two beams 25 and 26 of equal intensity. The light beams 25 and 26 strike the mirrors 27 and 28 that direct reflection beams to the plane of focus 31. The projection lens 19 is adjusted so that both beams 29 and 30 focus on the plane 31. When the focusing is correct, the forward edge 32 of the focal plane 31 is white and the rearward edge 33, which coincides with the axis of rotation of the platform 69, is black. In between these edges of the focal plane 31 the light varies through a linear scale of grey tones from white to black.

The lens 39 of the camera 12 is focused so that reflections of light from the object 72 are focused on the film holder 63. It will be understood that the lens 39 and the film have a depth of field that is of sufficiently great range to give a sharp focus of any point on the plane of focus 31. Now the projector lamp 16 is turned off, the film is put into the film holder 63, and the box 10 is closed making the system ready for use.

Although the motor 68 is reversible, it is operated in only one direction during any filming. At the start, the film holder 63 is adjacent one end 47 or 48 of the curved space 46. Then the motor is turned on as the projection lamp is simultaneously lit. As the motor operates, the platform 69 rotates, rotating the object 72. At all times, the projector 11 projects the two beams 25 and 26 that are reflected to the beams 29 and 30 focusing on opposite sides of the plane 31. The use of the two beams minimizes the blurring and distortion that might occur due to variations in the angles of reflection from the irregular shaped object 72.

As the platform 69 rotates at uniform speed, the gear 75 drives the rack 76 and moves the film holder 63 at a uniform speed through the slot 46. All this takes place while the projector is focusing the plane of light on the plane 31. As irregularities on the surface of the object 72 intersect the plane of light 31, they reflect different shades of light depending upon the distance of a point on the surface of the object from its axis of rotation. Therefore, each point on the surface of the object 72 reflects a shade of light that is exposed on the film carried by the film holder 63. This creates a film of variable density proportional to the distance of all points on the surface of the object 72.

The speed of rotation of the platform 69 is such that at least a full rotation of the object 72 occurs during passage of the film holder 63 past the vertical slit 41 in the camera 12. After the film is developed it has on it an accurate representation of the systems of all points on the surface of the object 72 from the axis of that object.

Various changes and modifications may be made within the purview of this invention as will be readily apparent to those skilled in the art. Such changes and modifications are within the scope and teaching of this invention as defined by the claims appended thereto.

What is claimed is:

1. A system for recording irregularities on the surface of an object comprising a support for the object, a camera for containing a sheet of light sensitive film and having a lens aimed at the object for focusing light reflected by the object onto the surface of the film, means for focusing a plane of light along the plane defined by a selected axis of the object and the focal axis of the camera lens and for causing the light plane to have points of intensity that differ in predetermined correspondence with the distance of such points from the selected object axis, means for producing relative revolution of the object and the light plane while maintaining the said correspondence of points of light intensity with object axis, and means for moving and exposing predetermined portions of the film to the light reflected by the portions of the object surface that intersect the light plane, and means operative with said means for producing relative revolution and means for moving and exposing for synchronizing the movement of the object and the film.

2. A system for recording irregularities on the surface of an object comprising means for focusing a plane of light in a plane which includes a predetermined axis of the object and for causing the light plane to have points that vary in light intensity in proportion to their distance from the predetermined axis, means for rotating the object about the predetermined axis so that all points on the surface, the irregularities of which are to be recorded, pass through the light plane, and means for sequentially photographing that light from the light plane that is reflected by the points on the object surface that intersect the light plane, the last-named means including a film support, means to focus reflections from points on the surface which pass through the light plane onto film in the film support, and means to move the film support relative to the object, and means operative with the rotating means and the said means to move the film support relative to the object for synchronizing the movement of film with the rotation of the object.

3. The system of claim 2 wherein the means for focusing the plane of light comprises a projector having a light wedge as its projected subject matter.

4. The system of claim 3 including means to divide the beam from the projector into two separate beams of substantially equal intensity and for focusing the two beams at the said plane of light.

5. A system for recording the surface characteristics of an object comprising a projector, a camera, and a rotatable platform for supporting the object, the projector having optics and a light source for emitting a light beam through the optics, means for dividing the light beam into two separate beams, means for directing the divided beams toward a plane of intersection that intersects the axis of rotation of the platform, the projector having means for focusing an image of variable light intensity on the said plane of intersection, a movable film support in the projector, and means for rotating the platform, the rotation of the platform causing points on the object that intersect the light plane to reflect light of predetermined intensity according to the variable intensity of the light plane, the camera having means to transmit only a thin slit of light to the film reflected by the object, and means for moving the film support past the thin slit of light, and means operative with the rotating means and the moving means for synchronizing the movement of the object and the film.

6. The system of claim 5 wherein the film support has means to maintain a uniform distance of all points on the film at least when such points are in the path of the thin slit of light.

References Cited by the Examiner

UNITED STATES PATENTS 774,549  11/1904  Baese.
2,066,996  1/1937  Morioka.

OTHER REFERENCES

Thin Films, Scientific American, December 1941, page 317.

NORTON ANSHER, *Primary Examiner.*

EVON C. BLUNK, V. A. SMITH, *Assistant Examiners.*